US006872466B2

(12) United States Patent
Robertson et al.

(10) Patent No.: US 6,872,466 B2

(45) Date of Patent: Mar. 29, 2005

(54) METHOD AND APPARATUS FOR REPAIRING SCREENS

(75) Inventors: Graham Robertson, Edinburgh (GB); Caspar Hassall, Edinburgh (GB)

(73) Assignee: United Wire Limited, Edinburgh (GB)

( * ) Notice: Subject to any disclaimer, the term of this patent is extended or adjusted under 35 U.S.C. 154(b) by 267 days.

(21) Appl. No.: 10/191,357

(22) Filed: Jul. 8, 2002

(65) Prior Publication Data

US 2003/0042190 A1 Mar. 6, 2003

(30) Foreign Application Priority Data

Aug. 29, 2001 (GB) .............................................. 0120863

(51) Int. Cl.$^{7}$ ........................... B32B 5/22; B32B 15/18; B23P 15/12; B21F 15/08

(52) U.S. Cl. ......................... 428/608; 428/683; 428/81; 428/223; 428/401; 428/594; 428/596; 210/495; 210/499; 29/897; 29/897.15; 228/262.41; 209/401; 209/402; 209/403; 209/404; 209/405

(58) Field of Search ................................ 428/608, 683, 428/81, 223, 401, 594, 596; 210/495, 499; 29/897, 897.15; 228/262.41; 209/401–405

(56) References Cited

U.S. PATENT DOCUMENTS 5,076,924 A * 12/1991 Persson et al. ............. 210/474
5,137,622 A * 8/1992 Souter ........................ 209/403
5,490,598 A 2/1996 Adams
5,626,234 A * 5/1997 Cook et al. ................. 209/315
5,851,393 A * 12/1998 Carr et al. .................. 210/489
6,029,824 A 2/2000 Adams
6,220,449 B1 * 4/2001 Schulte et al. .............. 209/401
6,675,975 B1 * 1/2004 Cook et al. ................. 210/490
6,713,190 B2 * 3/2004 Cook et al. ................. 428/608
6,722,504 B2 * 4/2004 Schulte et al. .............. 209/359
6,736,270 B2 * 5/2004 Adams et al. .............. 209/399

FOREIGN PATENT DOCUMENTS

WO WO-92/00133 A1 1/1992

* cited by examiner

*Primary Examiner*—Minh-Chau T. Pham
(74) *Attorney, Agent, or Firm*—Barnes & Thornburg LLP

(57) ABSTRACT

A method of plugging an area of damaged mesh in a sifting screen. The method is applicable to screens in which woven wire mesh is stretched, tensioned and secured over a supporting frame containing a plurality of windows and in which local damage to the mesh is in an area of the mesh which overlies one of the windows. The method has the steps of inserting into the window a device which is a close fit therein, and securing the device in the window so as to completely cover the area of damaged mesh. The device may be a former having stretched thereacross and secured thereto mesh similar to that stretched across the window in question, or simply a plate or block. The device may be secured in place by a force or interference fit, mechanical means, or adhesive, or the device may be resiliently deformable to allow it to be pushed past a projection in the window, so as to snap fit the device in place.

19 Claims, 3 Drawing Sheets

METHOD AND APPARATUS FOR REPAIRING SCREENS

FIELD OF INVENTION

This invention concerns screens which can be used as filters in industrial filtration equipment such as shakers that are used in the oil drilling industry for separating solids from the liquid phase of oil and water based muds retrieved from drilling operations. In particular the invention is concerned with a method and device for plugging small areas of the mesh of such screens which can become damaged in use.

BACKGROUND

Filtering machines of this type are described in UK 2237521 and UK 2229771 and screens of the type are described in W095/23655 and UK 2322590.

As best seen from FIGS. 1, 11 and 24 of UK 2322590 it has become conventional practice to effectively divide up the mesh area by stretching and securing layers of mesh over a frame, the large opening in which is divided into a large number of similarly sized smaller windows by an orthogonal array of ribs. The mesh is secured to the ribs as well as to the surrounding frame, so that each area of unsupported mesh is relatively small and is defined by the area of each of the small windows defined by the ribs.

Damage tends to be in the form of perforation of the mesh in one or more of the small unsupported areas of mesh, causing that area of the mesh to allow through larger particles than it should. Once this occurs the screen must be replaced or repaired.

Since each small area only accounts for a small percentage of the overall throughput of filtered material, it is possible to block a number of windows in a screen before its throughput falls too much to enable it to continue to be used. It is known to patch such windows with a layer of quick-setting epoxy or other plastics or resin based material, which when cured forms an impenetrable film or coating over the window concerned. This prevents the escape of oversize particles through the window due to the opening in the mesh caused by the damage.

It is an object of the present invention to provide an improved screen design and improved device and method for blocking off (i.e. plugging) windows in screens as aforesaid in this way.

Reference to mesh herein means woven wire mesh and the invention is equally applicable to screens having a single layer of woven wire mesh or two or more layers of woven wire mesh stretched over and secured to the frame and ribs as above described.

The invention is also applicable to frames and ribs made from plastics or reinforced plastics materials such as GRP, with or without metal reinforcing and to frames and ribs made from metal, which may be coated with a plastics or resin based material to inhibit corrosion.

SUMMARY OF THE INVENTION

According to the present invention there is provided a method of plugging an area of damaged mesh in a sifting screen wherein the area is defined by a window in a supporting frame over which the mesh is stretched and tensioned and secured, the method comprising the steps of inserting into the window a device which is a close fit therein, and securing the device in the window so as to completely cover the area of damaged mesh.

The device may be a plate or block.

Alternatively the device may comprise a former having stretched thereacross and secured thereto mesh similar to that stretched across the window in question.

The device may be secured in place by a force fit in the window.

Alternatively the device is secured may be place by an interference fit with the window.

Alternatively the device may be secured in place by mechanical means.

Alternatively the device may be secured in place by an adhesive.

In a preferred embodiment the device is resiliently deformable to allow it to be pushed past at least one projection on at least one of the elements which define the window, so that the step of fitting the device so as to cover the damaged mesh in the window involves pushing the device into the window and snapping it into place.

In a method as aforesaid wherein the upper surface of the screen is substantially flat and is comprised of mesh stretched and tensioned over, and bonded to, a generally flat upper surface of the supporting frame, and wherein the underside of the supporting frame is made up of intersecting orthogonal rows and columns of ribs defining the windows in the frame, a preferred method involves the step of fitting and securing the device into one of the rectangular window defining cavities on the underside of the screen.

Where all the cavities on the underside of the screen are of similar shape and size, only one design of device is required.

Preferably side faces of the ribs are provided with lips which are parallel to but spaced from the underside of the mesh, and the device is adapted to be fitted in place by forcing at least part of it beyond the lips so that it snaps into place below the damaged mesh.

The lips may be formed on the side faces of two of the ribs defining each cavity.

Similar lips may also be formed on the side face of one or both of the other ribs defining each cavity.

In one embodiment the device is pushed wholly beyond the lips to be sandwiched between the damaged mesh and the lips.

In another embodiment the edges of the device are shaped so as to facilitate its insertion beyond the lips on the ribs, but are such that once in place, the edges of the device impede its movement in the reverse direction.

To this end opposite edges of the device may be formed with ridges defining shoulders which are complementary to the lips, and the device is pushed into the window until the shoulders are beyond the lips, the material from which the device is formed having a resilience which permits the shoulders to snap over the lips.

Two or more lines of ridges may be provided on each of the edges of the device, each ridge defining a shoulder, to constitute a so called fir-tree connection with the lips.

Likewise two or more lines of lips may be provided on the sides of the ribs.

The lips and ridges conveniently have inclined surfaces to facilitate insertion of the device into the window and substantially perpendicular faces which engage to inhibit movement in the reverse direction, once the device snapped into place.

The invention also lies in a system for repairing a sifting screen containing damaged mesh of the type wherein tensioned mesh is secured to a frame made up of orthogonal intersecting ribs defining a rectilinear array of rectangular openings on the underside of the mesh, and in which an area of mesh in one of the openings is damaged, in which at least one ridge or lip is formed along inwardly facing walls of opposite ribs defining each opening, and a device for plugging an opening comprises a rectilinear closure member of plastics material which is adapted to be fitted into the opening containing the damaged mesh with at least some of the closure member beyond the ridges or lips in the opening, so as to completely block that opening, and the closure member is formed with complementary ridges or lips along opposite sides thereof to co-operate with the ridges or lips in the opening into which it is to be fitted, to retain the closure member in place.

The ridge or lip on the ribs, or the complementary ridge or lip on the sides of the closure member, or both, may be resiliently deformable to assist in pushing the closure member into position.

Where the screen frame is formed from plastics or glass reinforced plastics material by a moulding process, the ridges or lips may be formed on the inwardly facing walls of the ribs defining the openings during manufacture of the frame.

The invention also lies in a frame for a screen of the type described, having a plurality of similarly sized openings defined by ribs to support tensioned mesh secured thereover during manufacture, in which at least some of the inwardly facing walls of the ribs include at least one ridge or lip, spaced from the ends of the openings over which the mesh will be secured, to enable a rectilinear closure having appropriate dimensions and formed with at least one complementary ridge or lip along corresponding sides to those of the openings which carry a ridge or lip, to be pushed into the opening from the end thereof opposite to that which is to be covered by the mesh, and retained in place by engagement between the ridges or lips on the sides of the opening and those on the edges of the closure.

At least some of the ridges or lips may be resiliently deformable, to assist in pushing the closure member into position.

The invention also lies in a rectilinear device of plastics or reinforced plastics material, adapted to be fitted into an opening in a sifting frame constructed as aforesaid.

The invention also lies in a kit of parts comprising a sifting screen of the type described utilising a supporting frame constructed as aforesaid and having tensioned mesh secured thereover, and a plurality of rectilinear devices as aforesaid each adapted to be inserted into a rectangular opening in the supporting frame to block the opening in the event of damage to the mesh stretched over that opening.

Where the windows in the frame are all of the same shape and size, the rectilinear devices in the kit can be all of one size and shape.

The invention will now be described by way of example with reference to the accompanying drawings, in which:

FIG. 1 is a cross section through an edge region of the frame of a rectilinear screen adapted to received plugging blocks for repair, in accordance with the present invention;

FIG. 2 is a cross section through the upper end of one of the ribs in the frame;

FIG. 3 is a cross section through a region of the screen and frame of FIG. 1 at right angles to the view of FIG. 1;

FIG. 4 is a cross section to an enlarged scale through the upper end of one of the transverse ribs of the frame of FIG. 3;

FIG. 5 is a perspective view of a block for plugging a window in the frame of FIG. 1 in accordance with the invention;

FIG. 6 is an end view of the block of FIG. 5; and

FIG. 7 is a top plan view of the block of FIG. 5.

The support frame is divided by a rectilinear array of perpendicularly crossing ribs arranged as rows and columns and formed integrally with the four edge flanges of the frame of which one is shown at 10.

Figure 1:
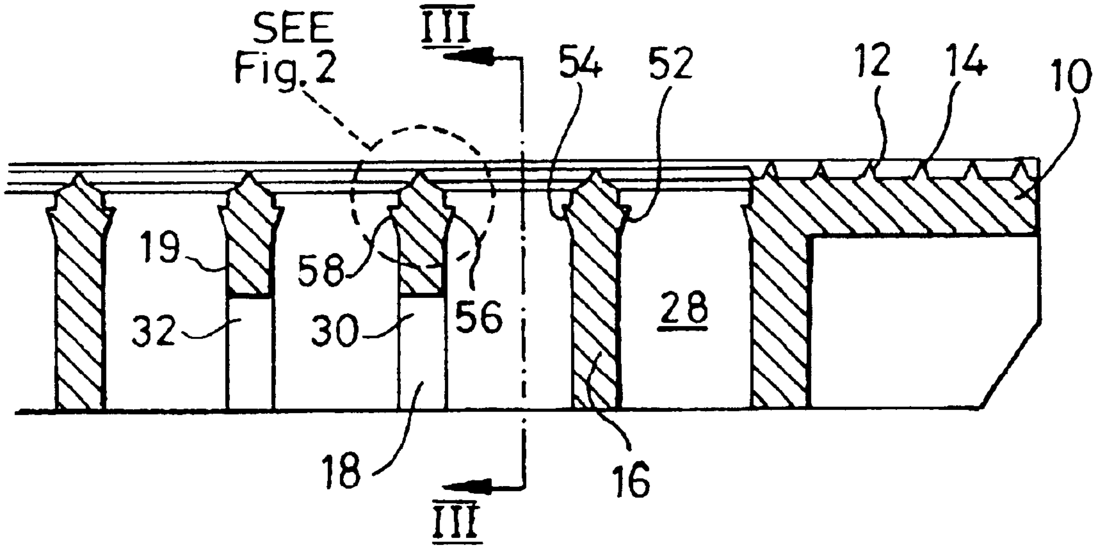
FIG. 1 shows in cross section one edge region of a rectilinear support frame moulded from a composite of glass reinforced plastics material of the type generally shown in FIG. 24 of UK Patent Specification 2322590. The edge includes a flange 10 the upper face of which is ridged at 12, 14 etc., so that wire mesh laid thereon and pressed down with the application of heat, will sink into the softened crests of the ridges 12, 14 etc., and remain embedded therein when the composite material cools.
Figure 2:
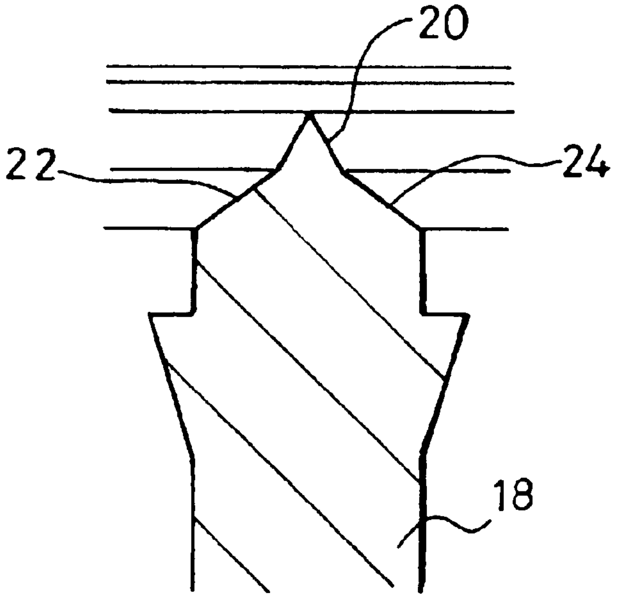

FIG. 1 shows some of the ribs forming rows of the array denoted by 16, 18 etc., and the upper end of each is formed with a 60° ridge 20 (as best seen in FIG. 2) which extends from two symmetrically slanting faces or lands 22, 24 at the upper end of the rib.

Figure 3:
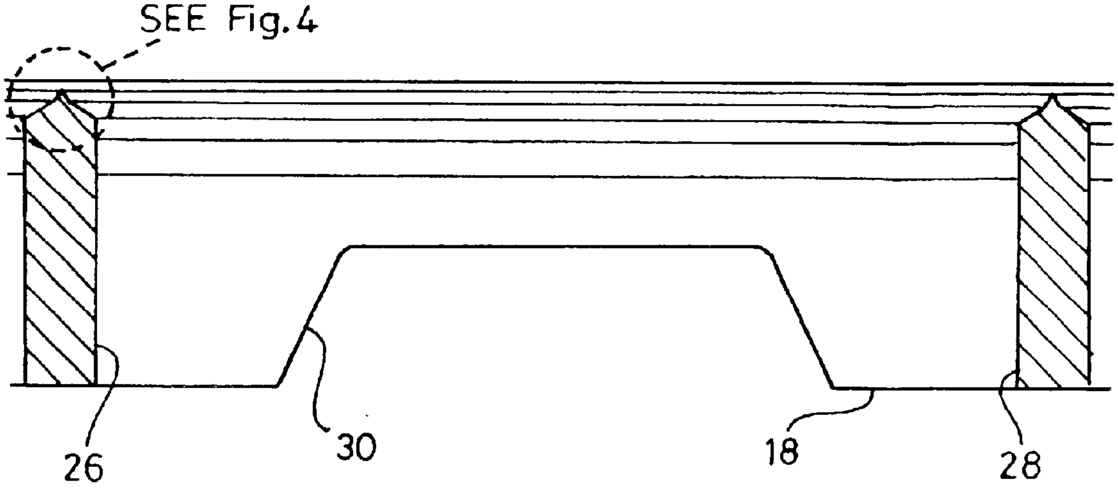

Two of the transversely extending ribs 26, 28 are shown in FIG. 3, the flat face of one of which is identified by reference numeral 28 in FIG. 1.

Some of the ribs 16, 18 etc., are cutaway as at 30 in rib 18 (and 32 in rib 19 in FIG. 1).

The cutaway is shown in elevation in FIG. 3 where flange 18 is shown viewed from the side in the direction of arrows III, III (see FIG. 1).

Figure 4:
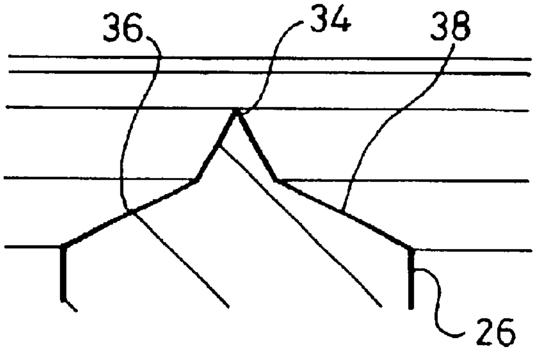

The upper edge of each rib 26, 28 etc., is, like the ribs 16, 18 etc., formed with a 60° ridge at 34 which extends along the length of the rib (26 in the case of FIG. 4) from two symmetrical inclined faces or lands 36, 38. The ridges 20 and 34 are also formed from composite material which softens on being heated, so that under pressure, wire mesh stretched both the frame and the ribs will not only become embedded in the ridges such as 12, 14 etc., in the flanges along the sides and ends of the frame, but also in the ridges such as 20 and 34 along all of the ribs intersecting the frame and dividing the large opening therein into a large number of small similarly dimensioned rectangular openings or windows.

Figure 5:
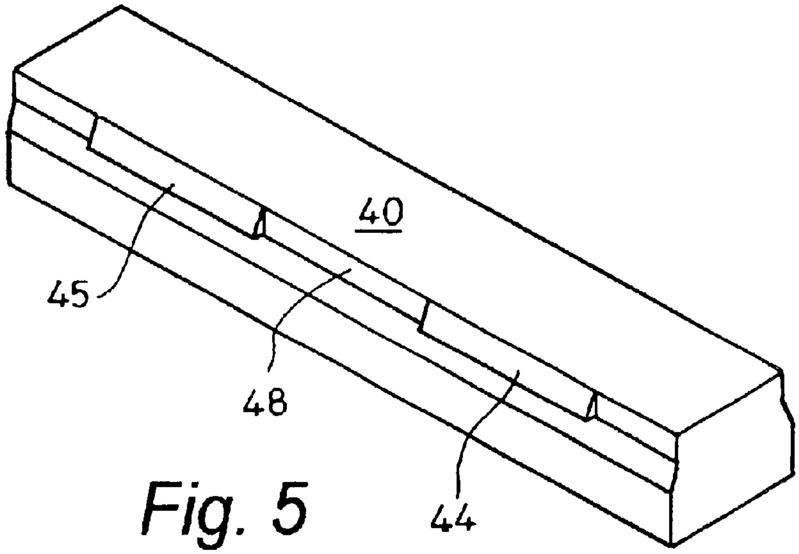
Figure 6:
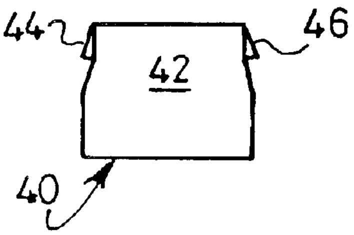
Figure 7:
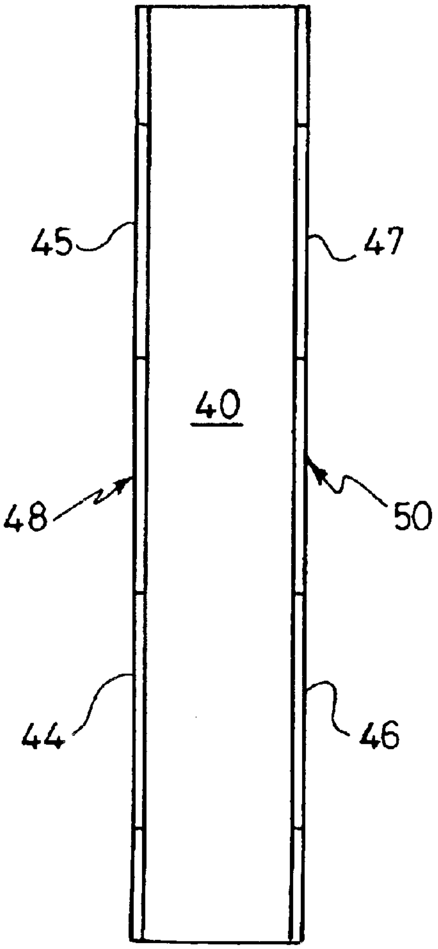

In accordance with the invention a block 40 is provided such as shown in FIG. 5, which is conveniently formed from resilient plastics material, or a composite of glass reinforced plastics material, for plugging one of the windows. The cross section profile of the block 40 is best seen in FIG. 6 from which it will be noted that the upper section is of reduced width at 42 and along part of the length of the block. On opposite faces of the reduced width section are formed triangular cross section ridges 44, 46. As shown in FIG. 5 two such ridges 44 and 45 are formed along one face 48, and two similar ridges 46, 47 are formed along the opposite face 50, none of which can be seen in FIG. 5, but which are visible in the plan view of FIG. 7.

Likewise the longer sides of each window such as formed by the ribs 16 and 18 are each provided with complementary triangular ridges on both sides of each rib, as shown at 52, 54 in the case of rib 16, and 56, 58 in the case of rib 18 in FIG. 1. Thus if a window defined by ribs 16, 18, 26 and 28 contains a damaged region of mesh and needs to be plugged, a block such as 40 is pushed upwardly from below until the ridges 44, 45 first snap over the ridge 56 on rib 18, and thereafter the ridges 46, 47 can be snapped over the ridge 54 on rib 16. The block is now held securely with its upper face in close contact with the damaged mesh extending over the window.

By ensuring the block 40 is a close fit within the opening, little or no liquid or solids will be able to migrate between ribs such as 16, 18, 26 and 28 and although that window will cease to filter product, it will not permit solids to pass through any damaged area of the mesh which registers with that window.

By arranging the ridges so that the inclined faces are first to engage and the perpendicular undersides engage after being snapped into place, there is little chance of a block 40 from being dislodged even under considerable top loading during filtering or as a consequence of vibration.

The block 40 may be solid or hollow.

Depending on acceptable lower levels of throughput, a plurality of blocks such as 40 can be fitted to plug a corresponding number of the windows in a screen, until such time as the total area which has become blinded by the blocks is too great to allow the screen to remain in service.

The invention provides a simpler and quicker method of replacing screens in situ, than hitherto. Thus previous methods have required the screens to be removed and cleaned before damaged areas could be treated. Some previously proposed methods have required all the cloth stretched over one of the small windows in the support frame to be removed by cutting, to enable a piece of material to be let in and bonded in place to effect the repair. Again this was time consuming, and could be hazardous to the operator, given that the cut ends of the wire cloth are like the sharp ends of pins and without protective clothing the operator's hands could easily suffer cuts and abrasions.

What is claimed is:

1. A method of plugging an area of damaged mesh in a sifting screen wherein the area is defined by a window in a supporting frame over which the mesh is stretched and tensioned and secured, the method comprising the steps of inserting into the window a device which is a close fit therein, and securing the device in the window so as to completely cover the area of damaged mesh, wherein the upper surface of the screen is substantially flat and is comprised of mesh stretched and tensioned over, and bonded to, a generally flat upper surface of the supporting frame, and wherein the underside of the supporting frame is made up of intersecting orthogonal rows and columns of ribs defining the windows in the frame, and the method involves the step of fitting and securing the device into one of the rectangular window defining cavities from the underside of the screen, whereby removal of the damaged mesh is rendered unnecessary.

2. A method as claimed in claim 1 wherein the device is a plate or block.

3. A method as claimed in claim 1 wherein the device comprises a former having stretched thereacross and secured thereto mesh similar to that stretched across the window in question.

4. A method as claimed in claim 1, wherein the device is secured in place by a force fit in the window.

5. A method as claimed in claim 1, wherein the device is secured in place by an interference fit with the window.

6. A method as claimed in claim 1, wherein the device is secured in place by mechanical means.

7. A method as claimed in claim 1, wherein the device is secured in place by an adhesive.

8. A method as claimed in claim 1 wherein the device is resiliently deformable to allow it to be pushed past at least one projection on at least one of the elements which define the window, so that the step of fitting the device so as to cover the damaged mesh in the window involves pushing the device into the window and snapping it into place.

9. A method as claimed in claim 1 wherein all the cavities are of similar shape and size so that only one design of device is required.

10. A method as claimed in claim 1 wherein side faces of the ribs are provided with lips which are parallel to but spaced from the underside of the mesh, and the device is adapted to be fitted in place by forcing at least part of it beyond the lips so that it snaps into place below the damaged mesh.

11. A method as claimed in claim 10 wherein the lips are formed on the side faces of at least two of the ribs defining each cavity.

12. A method as claimed in claim 10 wherein the device is pushed wholly beyond the lips to be sandwiched between the damaged mesh and the lips.

13. A method as claimed in claim 10 wherein the edges of the device are shaped so as to facilitate its insertion beyond the lips on the ribs, but are such that once in place, the edges of the device impede its movement in the reverse direction.

14. A method as claimed in claim 13 wherein opposite edges of the device are formed with ridges defining shoulders which are complementary to the lips, and the device is pushed into the window until the shoulders are beyond the lips, the material from which the device is formed having a resilience which permits the shoulders to snap over the lips.

15. A system for repairing a sifting screen containing damaged mesh, wherein tensioned mesh is secured to a frame made up of orthogonal intersecting ribs defining a rectilinear array of rectangular openings on the underside of the mesh, and in which an area of mesh in one of the openings can be damaged, comprising at least one ridge or lip formed along at least some of the inwardly facing walls of opposite ribs defining each opening, and a device for plugging an opening containing damaged mesh, the device comprising a rectilinear closure member of plastics material adapted to be fitted from the underside of the screen into said opening containing the damaged mesh with at least some of the closure member extending above the ridges or lips in the opening, so as to completely block said opening, and the closure member being formed with complementary ridges or lips along opposite sides thereof to co-operate with the ridges or lips in the opening into which it is to be fitted, to retain the closure member in place.

16. A system as claimed in claim 15 wherein the screen frame is formed from plastics or glass reinforced plastics material by a moulding process in which the ridges or lips are formed on the inwardly facing walls of the ribs defining the openings during manufacture of the frame.

17. A frame for a screen, having a plurality of similarly sized openings defined by ribs to support tensioned mesh secured thereover during manufacture, in which at least some of the inwardly facing walls of the ribs include at least one ridge or lip, spaced from the ends of the openings over which the mesh will be secured, to enable a rectilinear closure having appropriate dimensions and formed with at least one complementary ridge or lip along corresponding sides to those of the openings which carry a ridge or lip, to be pushed into the opening from the end thereof opposite to that which is to be covered by the mesh, and retained in place by engagement between the ridges or lips on the sides of the opening and those on the edges of the closure.

18. A rectilinear device, of plastics or reinforced plastics material, adapted to be fitted into an opening in a sifting frame constructed as claimed in claim 17.

19. A kit of parts comprising a sifting screen utilising a supporting frame constructed as claimed in claim 17 and having tensioned mesh secured thereover, and a plurality of rectilinear devices each adapted to be inserted into a rectangular opening in the supporting frame to block the opening in the event of damage to the mesh stretched over that opening.

* * * * *